US011935396B2

(12) United States Patent
Mayr

(10) Patent No.: US 11,935,396 B2
(45) Date of Patent: Mar. 19, 2024

(54) DYNAMIC AND/OR ADAPTIVE SIGNPOSTING SYSTEM

(71) Applicant: ZUMTOBEL LIGHTING GMBH, Dornbirn (AT)

(72) Inventor: Gregor Mayr, Gaißau (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 17/776,272

(22) PCT Filed: Nov. 5, 2020

(86) PCT No.: PCT/EP2020/081108
§ 371 (c)(1),
(2) Date: May 12, 2022

(87) PCT Pub. No.: WO2021/094189
PCT Pub. Date: May 20, 2021

(65) Prior Publication Data

US 2022/0392321 A1 Dec. 8, 2022

(30) Foreign Application Priority Data

Nov. 14, 2019 (DE) ..................... 10 2019 130 700.7

(51) Int. Cl.
*G08B 7/06* (2006.01)
*G09G 3/32* (2016.01)
*G09G 3/34* (2006.01)

(52) U.S. Cl.
CPC ............... *G08B 7/066* (2013.01); *G09G 3/32* (2013.01); *G09G 3/344* (2013.01); *G09G 2330/023* (2013.01)

(58) Field of Classification Search
CPC .......... G08B 7/066; G09G 3/32; G09G 3/344; G09G 2330/023
See application file for complete search history.

(56) References Cited

U.S. PATENT DOCUMENTS 5,224,053 A * 6/1993 Cook ...................... B30B 15/26 700/83
5,369,735 A * 11/1994 Thier .................. H04N 5/2628 348/580

(Continued)

FOREIGN PATENT DOCUMENTS

DE 102015218161 3/2017
EP 3800624 A1 * 4/2021 ......... G01C 21/3682

(Continued)

OTHER PUBLICATIONS

PCT/EP2020/081108, International Search Report and Written Opinion dated Jan. 25, 2021, 6 pages, and English translation, 6 pages.

*Primary Examiner* — Chico A Foxx
(74) *Attorney, Agent, or Firm* — Andrus Intellectual Property Law, LLP

(57) ABSTRACT

The invention relates to a dynamic and/or adaptive signposting system (10), comprising at least one sensor (11*a-e*) that is designed to sense a physical variable relevant to the route guidance, at least one display device (13, 13*a-c*) that comprises a dynamic display (21), wherein the dynamic display (21) is designed to retain a displayed image in an unpowered state, a control unit (15) that is designed to ascertain a control signal on the basis of the physical variable relevant to the route guidance, wherein the control unit (15) is furthermore designed to actuate the at least one display device (13, 13*a-c*) by way of the control signal so as to display an image stored in full or in part beforehand on the dynamic display (21).

13 Claims, 8 Drawing Sheets

(56) References Cited

U.S. PATENT DOCUMENTS

| | | | | |
|---|---|---|---|---|
| 5,809,447 | A * | 9/1998 | Kato | G01C 21/3629 340/996 |
| 8,970,354 | B2 | 3/2015 | Lewis | |
| 2009/0138353 | A1* | 5/2009 | Mendelson | G01S 5/0226 342/463 |
| 2009/0270065 | A1 | 10/2009 | Hamada et al. | |
| 2013/0282280 | A1* | 10/2013 | Patterson | G08B 7/066 701/533 |
| 2014/0222329 | A1* | 8/2014 | Frey | G08B 7/066 701/423 |
| 2018/0050226 | A1* | 2/2018 | Park | G09F 27/00 |
| 2020/0300651 | A1* | 9/2020 | Stober | G01C 21/362 |

FOREIGN PATENT DOCUMENTS

| | | | | |
|---|---|---|---|---|
| WO | 2010142843 | | 12/2010 | |
| WO | WO-2011054495 | A1 * | 5/2011 | A62B 3/00 |
| WO | WO-2013083869 | A1 * | 6/2013 | G08B 7/062 |

* cited by examiner

61

| | *Fire zone 1* | | | | *Fire zone 2* | | | | | |
|---|---|---|---|---|---|---|---|---|---|---|
| | *Picto 1* | *Picto 2* | *Picto 3* | *Picto 4* | *Picto 5* | *Picto 6* | *Picto 7* | *Picto 8* | *Picto 9* | *Picto 10* |
| Smoke detector 1 | Left | Right | Right | Down | Down | Down | Left | Right | Left | Right |
| Smoke detector 2 | Left | **Left** | Right | Down | Down | Down | Left | Right | Left | Right |
| Smoke detector 3 | Left | Right | Right | Down | Down | **X** | Left | **Left** | Left | Right |
| Smoke detector 4 | Left | Right | **Left** | **X** | Down | Down | Left | Right | Left | Right |
| Smoke detector 5 | Left | Left | **Right** | **X** | Down | Down | Left | Right | Left | Right |

Fig. 6

DYNAMIC AND/OR ADAPTIVE SIGNPOSTING SYSTEM

CROSS-REFERENCE TO RELATED APPLICATION

The present application is the U.S. national stage application of international application PCT/EP2020/081108 filed Nov. 5, 2020, which international application was published on May 20, 2021 as International Publication WO 2021/094189 A1. The international application claims priority to German Patent Application 10 2019 130 700.7 filed Nov. 14, 2019.

FIELD OF THE INVENTION

The present invention relates to a dynamic and/or adaptive signposting system, and to a method for dynamic and/or adaptive signposting.

BACKGROUND OF THE INVENTION

Safety displays enable persons to leave a building quickly and safely in an emergency situation, for example a fire. Such safety displays should also be visible even in the event of a disruption of the general electrical lighting system of the building.

An example of safety displays are safety sign lights which indicate to persons an exit or escape route to leave a building. Such safety sign lights are often illuminated pictograms which show a stylized running figure and an arrow in the direction of the escape route, but can also comprise other symbols (e.g., the lettering "EXIT"). The pictograms are static and are, for example, glued, inserted, or printed onto signs.

One problem of these systems is that the static pictograms may guide persons directly into a dangerous situation, for example a smoky room.

In order to solve this problem, dynamic safety displays are known in which a part of the safety sign lights is designed as liquid crystal displays (LCD) or as LED displays. The latter, for example, in the form of an LED matrix or by means of coupling LED light into a light guide plate. With these displays, an arrow is shown in the direction of the escape route, wherein the arrow direction can be adjusted by actuating the display. The actuation takes place depending on smoke detector data, for example.

However, the known dynamic safety displays are problematic. On the one hand, the arrows presented using these displays often do not meet the regulations and standards according to form, color, or luminance for safety signs (EN1838, ISO7010, ISO3864). On the other hand, given these displays, a failure of the internal power supply results in the displays no longer displaying anything, whereas a simple, printed pictogram is still readable when daylight is present, for example.

It is therefore an object of the present invention to provide an improved signposting system, and an improved method for dynamic and/or adaptive signposting, which remedy the aforementioned disadvantages of the prior art. In particular, the object of the present invention is to provide a dynamic and/or adaptive signposting system that enables images to be displayed even in the event of a failure of the power supply of the system.

These and other objects, which will be mentioned during reading of the following description or which can be recognized by a person skilled in the art, are achieved by the subject-matter of the independent claims. The dependent claims develop the central idea of the present invention in a particularly advantageous manner.

SUMMARY OF THE INVENTION

According to a first aspect, the invention relates to a dynamic and/or adaptive signposting system comprising at least one sensor that is designed to sense a physical variable relevant to a route guidance; at least one display device that comprises a dynamic display, wherein the dynamic display is designed to retain a displayed image in an unpowered state; and a control unit that is designed to ascertain a control signal on the basis of the physical variable relevant to the route guidance, wherein the control unit is furthermore designed to actuate the at least one display device with the control signal to display a completely or partially prestored image on the dynamic display. The advantage is thereby achieved that a particularly safe and reliable signposting system is created.

In particular, the at least one dynamic display can display an image even when a power supply of the system, in particular of the display device, has failed. The use of prestored images furthermore allows a reliable and quick display of standardized and easily recognizable images.

By means of the display device, the dynamic and/or adaptive signposting system can indicate to persons a certain route, e.g., an exit route, or a certain direction, depending on the variable sensed by the sensor. Persons can thus be guided through an environment on defined routes.

The dynamic signposting system is, in particular, an adaptive signposting system that can still change a display even during ongoing emergency operation.

For example, the signposting system is an emergency light system for an environment, in particular a building. The signposting system may comprise an emergency lighting system, a safety lighting system, an escape route lighting system, and/or escape route signs.

The at least one display device can form an exit or escape route sign and can be arranged on a wall or on the ceiling of a building. The display device may comprise a housing in which the dynamic display is embedded.

The physical variable relevant to the route guidance may comprise at least one of the following variables: light intensity; temperature; current value; gas concentration; noise, in particular noise level; or position of persons in space.

In particular, the physical variable relevant to the route guidance is a physical variable relevant to safety, in particular to the exit route. The physical variable can indicate a dangerous situation, such as a fire or the presence of dangerous gases; the position and/or the state of persons; or further hazardous situations, such as terror, mass gatherings of people; or mass movements of people.

The term "dynamic display" is understood to mean any type of indicator or display that can be actuated to display different static and/or dynamic images.

Given use of the display device as an exit or escape route sign, the dynamic display can depict an escape route display, an exit route display, or an exit route sign of the signposting system.

For example, the at least one dynamic display shows a stylized figure on a green background and an arrow in the direction of an escape route. The direction of the arrow can be dynamically adjusted on the basis of the control signal. However, other safety signs are also possible, such as the lettering "EXIT" as used, for example, in the USA.

The dynamic display retains a displayed image in an unpowered state. This means that the dynamic display uses a display technique that allows images to be displayed permanently without the need for a maintenance voltage for this purpose.

In particular, the dynamic display is designed as a bistable display that only requires a power supply for changing the display. The bistable display is, for example, an eINK display or another bistable display, e.g., a bistable LCD display, a flip-dot display, a display on the basis of electrophoretically controlled total reflection, or a display on the basis of interferometrically operating modulators (IMOD).

The dynamic display can furthermore be designed as a reflective or transflective display. A transflective display uses ambient light via proportional reflection as an additional light source.

According to one embodiment, the dynamic display comprises an e-paper display. The advantage is thereby achieved that a dynamic display is created that continues to display a set image even when a power supply fails.

E-paper displays offer the further advantage that the display presented with them has an appearance strongly resembling that of classical signage. Existing standards for the appearance of safety displays can be more easily met by this type of display.

According to one embodiment, the dynamic display is designed to display static or dynamic images, in particular pictograms, and/or text. The advantage is thereby achieved that route information can be communicated particularly efficiently.

According to one embodiment, the dynamic display is a multicolored display. The advantage is thereby achieved that the presented images can be better recognized. For example, pictograms can be displayed with the correct colors, whereby in particular standards for safety displays can be met.

According to one embodiment, the at least one display device comprises a lighting system, in particular an LED lighting system, which is arranged to illuminate the dynamic display. The advantage is thereby achieved that the dynamic display can be better recognized. In particular given the embodiment of the dynamic display as a reflective e-paper display, the illumination, and thus the readability, can be improved by the lighting system of the display.

According to one embodiment, the dynamic display comprises a first and a second display region, wherein the dynamic display is designed to display, in response to the control signal, a static image in the first display region and a dynamic image in the second display region. The advantage is thereby achieved that route information can be communicated particularly efficiently.

According to one embodiment, the dynamic display comprises a first and a second display region, wherein the safety sign is presented in the first display region, and additional information which makes it easier for the persons to comprehend the situation and, in particular, to exit safely can be presented in the second region. The dynamic display may furthermore comprise dynamic animations, such as blinking arrows or running lights, which increase the recognizability of the sign.

The dynamic display can be designed to continue to display at least one static image of the dynamic display in the event of a power failure.

According to one embodiment, the signposting system comprises a central power supply system, in particular a central battery system or another central power source, such as a diesel supply or a second power grid, etc., for supplying power to the at least one display device; and/or the at least one display device comprises a local power supply system, in particular a local battery or another local power source, such as a supercap or a fuel cell, etc., to supply power. The advantage is thereby achieved that a reliable power supply of the system is made possible independently of the power supply of the building.

The central power supply system can furthermore be designed to supply power to the control unit and/or the at least one sensor. The control unit can at least partially comprise the central power supply system.

According to one embodiment, the at least one sensor is a smoke detector, a gas sensor, an acoustic sensor, a camera, and/or a presence sensor. The advantage is thereby achieved that the physical variable can be sensed efficiently.

According to one embodiment, the signposting system comprises a plurality of sensors, in particular a plurality of sensors of different types, for sensing further physical variables relevant to the route guidance, wherein the control unit is designed to additionally ascertain the control signal on the basis of the sensed further physical variables. The advantage is thereby achieved that a particularly safe system is created.

According to one embodiment, the at least one display device comprises a memory in which images, in particular pictograms, for displaying on the dynamic display are completely or partially stored. The advantage is thereby achieved that the images can be efficiently retrieved and displayed.

According to one embodiment, the signposting system furthermore comprises at least one acoustic indicator, in particular a siren and/or a loudspeaker, for outputting acoustic signals. The advantage is thereby achieved that the safety of the system is further increased.

According to one embodiment, the control unit is connected to the at least one display device by means of a Digital Addressable Lighting Interface (DALI), a power line communication (PLC) connection, or a wireless connection. The advantage is thereby achieved that the control signal can be efficiently transmitted to the display device.

The at least one display device and/or the control unit can respectively comprise a PLC interface, a DALI interface, and/or a wireless communication interface.

According to one embodiment, the control unit is designed to ascertain the control signal by means of a lookup table; a function, in particular a predefined function; an AI algorithm; and/or a neural network, in particular a trained neural network. The advantage is thereby achieved that the control signal can be ascertained efficiently.

The control unit may comprise a logic unit for ascertaining the control command The logic unit may be implemented as software in a processor of the control unit.

The AI algorithm may comprise a learning algorithm based on artificial intelligence (AI).

According to one embodiment, the control unit can be connected to a cloud, wherein the control unit is designed to transmit to the cloud the sensed physical variable relevant to the route guidance, and to receive from the cloud the control command and/or an instruction for ascertaining the control command The advantage is thereby achieved that the control signal can be ascertained particularly efficiently.

The cloud may comprise a cloud server and/or a cloud database. The cloud may comprise a data memory and software, in particular an AI algorithm, for ascertaining the control command on the basis of the physical variable relevant to the route guidance and/or on the basis of variables stored in the data memory.

According to one embodiment, the at least one display device can be set to a startup mode and/or maintenance mode, wherein the at least one display device is designed to display information relating to maintenance in the maintenance mode, and information relating to the startup of the at least one display device and/or of the signposting system in the startup mode. The advantage is thereby achieved that the system and/or the display device can be efficiently started up and/or serviced.

The startup mode and/or maintenance mode may be activatable using a concealed button on the display device or by means of an NFC interface.

According to a second aspect, the invention relates to a method for dynamic and/or adaptive signposting, comprising sensing a physical variable relevant to a route guidance, ascertaining a control signal on the basis of the physical variable relevant to the route guidance, actuating a display device with the control signal, and displaying a completely or partially prestored image on a dynamic display of the display device, wherein the dynamic display is designed to retain the image in an unpowered state. This achieves the advantage that a particularly secure and reliable signposting system is created.

According to one embodiment, the control signal is ascertained by means of a lookup table; a function, in particular a predefined function; an AI algorithm; and/or a neural network, in particular a trained neural network. The advantage is thereby achieved that the control signal can be ascertained particularly efficiently.

According to one embodiment, the method comprises a sensing of further physical variables relevant to the route guidance, wherein the control signal is additionally ascertained on the basis of the further sensed physical variables. This achieves the advantage that the control signal can be ascertained particularly efficiently.

The method can be implemented with the signposting system according to the first aspect of the invention.

In particular, the physical variable relevant to the route guidance is sensed by at least one sensor, and the control signal is ascertained by a control unit on the basis of the sensed physical variable.

BRIEF DESCRIPTION OF DRAWINGS

A detailed description of Figures is given below. These show:

FIG. 6 is a preferred embodiment of a lookup table.

DETAILED DESCRIPTION

Figure 1A:
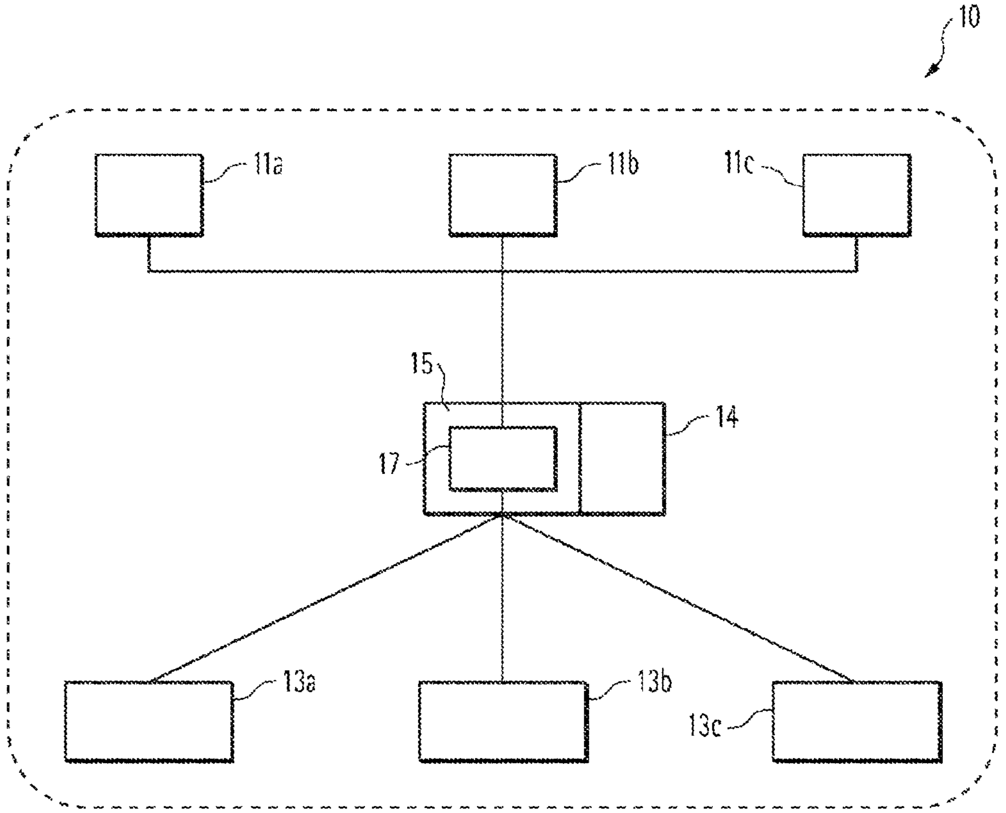
FIG. 1*a* is a schematic representation of a preferred embodiment of a dynamic and/or adaptive signposting system.

FIG. 1*a* discloses a schematic representation of a preferred embodiment of a dynamic and/or adaptive signposting system 10.

The signposting system 10 comprises at least one sensor 11*a-c* that is designed to sense a physical variable relevant to a route guidance; at least one display device 13*a-c* that comprises a dynamic display, wherein the dynamic display is designed to retain a displayed image in an unpowered state; a control unit 15 that is designed to ascertain a control signal on the basis of the physical variable relevant to the route guidance, wherein the control unit 15 is furthermore designed to actuate the at least one display device 13*a-c* with the control signal to display a completely or partially prestored image on the dynamic display.

By means of the display device, the dynamic and/or adaptive signposting system 10 can display to persons a certain route or a certain direction depending on the variable sensed by the sensor. Persons can thus be guided through an environment on defined routes.

For example, the dynamic and/or adaptive signposting system 10 is an emergency light system for an environment, in particular a building. The signposting system 10 may comprise an emergency lighting system, a safety lighting system, an escape route lighting system, and/or escape route signs.

For example, the dynamic and/or adaptive signposting system 10 comprises a plurality of display devices 13*a-c* which, on their dynamic display, respectively depict a stylized figure on a green background and an arrow in the direction of an escape route. The direction of the arrow can be dynamically adjusted on the basis of the control signal. The signposting system 10 can thus form a dynamic exit route system for a building.

According to one embodiment, the control unit 15 comprises a logic unit 17, e.g., a processor. The logic unit 17 can be designed to ascertain the control command The logic unit 17 may be implemented as software.

The dynamic and/or adaptive signposting system 10 may furthermore comprise a central power supply system in the form of a central battery system 14 or another central power source (e.g., diesel supply, or a second power grid, etc.). The battery system can be designed to supply power to the display devices 13*a-c*, the sensors 11*a-c*, and/or the control unit 15. In a further embodiment, the control unit 15 may at least partially comprise the central power supply system, in particular the central battery system 14.

According to one embodiment, the signposting system 10 comprises a plurality of sensors 11*a-c* that are respectively designed for sensing physical variables relevant to the route guidance, in particular different physical variables. The control unit 15 can be designed to ascertain the control signal for each display device 13*a-c* on the basis of the sensed physical variables relevant to the route guidance.

The sensors are, for example, smoke detectors from which the control unit 15 or the battery system 14 receives the information as to which rooms of a building are smoky.

The signposting system 10 may comprise at least parts of a central fire alarm system (BMZ), or be connected to a BMZ, wherein the sensors 11*a-c* can be connected directly to the BMZ. The logic unit 17 of the control unit 15 may be connected between the BMZ and the battery system 14 and trigger what are known as emergency light scenarios. For example, an alarm of a smoke detector with No. 2 means that a display with No. 3 displays a red cross, or an alarm of a smoke detector with No. 5 means that the arrow direction changes from right to left in a display with No. 3.

The control unit 15 can be connected, in terms of communication, to the at least one display device 13*a-c*. The battery system 14 receives, for example, the information of the central fire alarm system or of the logic unit 17 and forwards it as a control command to the display devices 13*a-c*. The control command can thereby be transmitted by means of a Digital Addressable Lighting Interface (DALI), a power line communication (PLC) connection, or a wireless connection.

According to one embodiment, after receiving the control command, the at least one display device 13*a-c* sends feedback to the control unit 15 so that a communication failure between the display device 13*a-c* and the control unit 15 can be ruled out.

According to one embodiment, various types of sensors, for example smoke detectors to detect a fire and gas sensors that recognize whether dangerous gases are present in a room, can be connected to the BMZ. The sensors may also include cameras and/or presence sensors that, for example, sense where persons are located in a building and in which state these persons are.

Furthermore, the sensors 11*a-c* may include acoustic sensors, e.g., microphones, that can sense noises in a room. A dangerous situation, e.g., a terror alarm or a fire, may be recognized on the basis of the noises via an intelligent software.

Figure 1B:
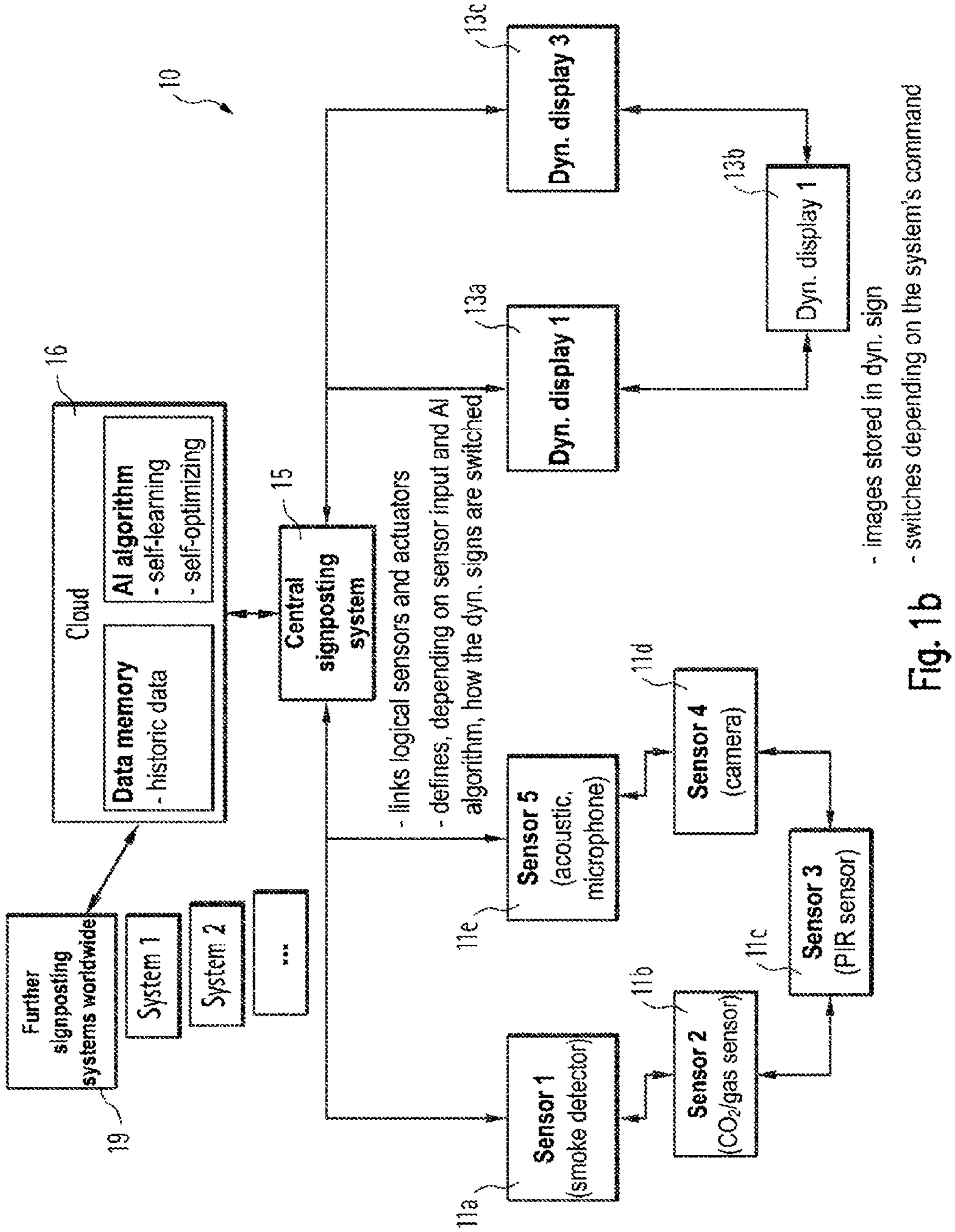
FIG. 1*b* is a schematic representation of a further embodiment of a dynamic and/or adaptive signposting system.

FIG. 1*b* discloses a schematic representation of a further embodiment of a dynamic and/or adaptive signposting system 10.

The dynamic and/or adaptive signposting system 10 in FIG. 11*b* comprises five sensors 11*a-e*: a smoke detector, a $CO_2$ sensor, a pyroelectric sensor, a camera, and a microphone. The sensors 11*a-e* are connected via the control unit 15 to three display devices 13 *a-c*.

In the exemplary embodiment of FIG. 1*b*, the control unit 15 forms a central signposting system. The control unit 15 may comprise a logic unit, in particular in the form of software, that is designed to actuate the display devices 13*a-c* situationally. The logic unit according to this embodiment is furthermore designed to develop in a self-learning manner.

According to one embodiment, the control unit 15 is designed to initially actuate the display device 13*a-c* according to a defined behavior, for example on the basis of a lookup table. Given use of the signposting system 10 as an emergency light system, the dynamic and/or adaptive signposting system 10 is designed, for example, to guide persons in the event of a fire to predefined alternative or exit routes.

According to one embodiment, the dynamic and/or adaptive signposting system 10 is a self-learning system. In particular, the signposting system 10 is designed to continuously detect and store behavior of persons caused by the system, for example the predefined alternative routes and the reaction of the persons to these alternative routes.

For example, in an emergency, how these persons move may be sensed via presence sensors or cameras (people tracking). The signposting system 10, in particular the control unit 15, can, for example, learn on the basis of this information that too many persons are guided to the same exit route, this exit route is consequently overloaded, and the risk of a mass panic is increasing. In a subsequent emergency, the signposting system 10 can then divide the flow of people up among two exit routes. The presence sensors or cameras used for this purpose can be integrated in the display devices 13*a-c* or be arranged separately.

The signposting system 10 may furthermore be designed to guide flows of people through an environment, with the aim of avoiding overloads. Examples thereof are the guiding of persons through museums, the purposeful guiding of persons to desired articles in a store, or the guiding of vehicles to free parking spaces in a parking garage or in a city.

According to one embodiment, the control unit 15 is connected to a cloud 16, in particular a cloud server or a cloud database. The dynamic and/or adaptive signposting system 10 may comprise the cloud 16 or may be connected to the cloud 16. The collected data can thus be stored and evaluated not only in the system but also in the cloud 16.

The dynamic and/or adaptive signposting system 10 can be designed to transmit, in particular in an anonymized manner, the collected data to the cloud 16, for example via the control unit 15 that is connected to the cloud 16.

The cloud 16 can be designed to store these data in a data store in the cloud 16. The cloud 16 may furthermore comprise software, in particular an artificial intelligence (AI) or an AI algorithm, for evaluating the data.

The software may be self-learning and/or self-optimizing software and may be designed to use new data for learning or optimization.

The cloud 16 may be connected to further signposting systems 19, in particular further signposting systems in other buildings, and can receive additional data from these further signposting systems 19. The cloud 16 can be designed to likewise use these additional data for learning or optimizing the software and/or for ascertaining the control command The further signposting systems 19 may be further emergency light systems in other buildings.

According to one embodiment, the software and/or the data of the cloud 16 are stored cyclically in the signposting system 10, in particular in the control unit 15, and updated continuously. A fail-safe system can thus be created, and delays can be avoided.

The dynamic and/or adaptive signposting system 10 may comprise further actuators, in particular acoustic indicators, in addition to the display devices 13*a-c*. These actuators may be sirens or loudspeakers for warning announcements. By means of the acoustic indicators, additional acoustic signals which supplement the visual displays (2-senses principle) are generated for people with vision impairment, for example.

In addition to fixedly installed sensors, the sensors 11*a-c* may also include mobile devices, in particular mobile telephones, tablets, or smartphones. The mobile devices can be connected in terms of communication to the signposting system, in particular to the control unit 15, and can, for example, transmit position data to the control unit 15. The control unit 15 can recognize, on the basis of the position data of the mobile devices, where persons are located in the building.

In a further embodiment, the display devices 13*a-c* may be activatable via mobile devices, for example via an app. After activation, the display devices 13*a-c* show desired information on their dynamic display.

In further embodiments, the signposting system 10 can be used for navigation, in particular for indoor navigation in buildings.

For example, the signposting system 10 forms an interactive video guide for a museum or a city. A visitor can activate the display devices 13*a-c* by means of an app, and this subsequently displays to said visitor information or videos about the environment. For this purpose, the display devices 13*a-c* can, for example, be located at exhibition pieces in the museum or at historic buildings.

In another application example, the dynamic and/or adaptive signposting system 10 can be used for finding a route in a shop. The signposting system 10 can be designed to guide a person to a specific article in the shop with the display devices 13*a-c*. Additional display devices 13*a-c* can be located at special articles, which additional display devices, after activation via an app, display additional information about these articles, e.g., about the production of the articles. Via the smartphone, the system can recognize the customer and thereupon display individualized information, e.g., customer offers.

In one application example, the dynamic and/or adaptive signposting system 10 is implemented in an office building and recognizes, on the basis of the sensor data, whether a workplace or a meeting room is occupied, and a person is guided to a free workspace or free room by means of the display device 13*a-c*. This can be displayed via an app or via appropriate displays at the meeting rooms.

In one application example, the signposting system 10 is implemented in a hospital in order to guide persons, e.g., physicians or visitors, to a patient. A waiting time may furthermore be displayed to waiting patients.

In one application example, the signposting system 10 is implemented in a retirement or nursing home. If, for example, an emergency button is actuated in a room of the retirement or nursing home, information for calming the patient, e.g., "Help is on the way," can be displayed in the room on a display device 13*a-c*, or a direct connection to a caregiver via video chat can be established.

In an alternative embodiment, the signposting system 10 is designed to display schedules, for example at railroad stations, airports, or bus stops. Persons can retrieve further schedule information via an associated app.

The signposting system 10 may furthermore be used for traffic management. For example, the display devices 13*a-c* form traffic signs that display additional information, for example a timer that indicates a waiting time in a traffic jam or a warning message regarding an accident or a dangerous situation, on the dynamic display.

Figure 2:
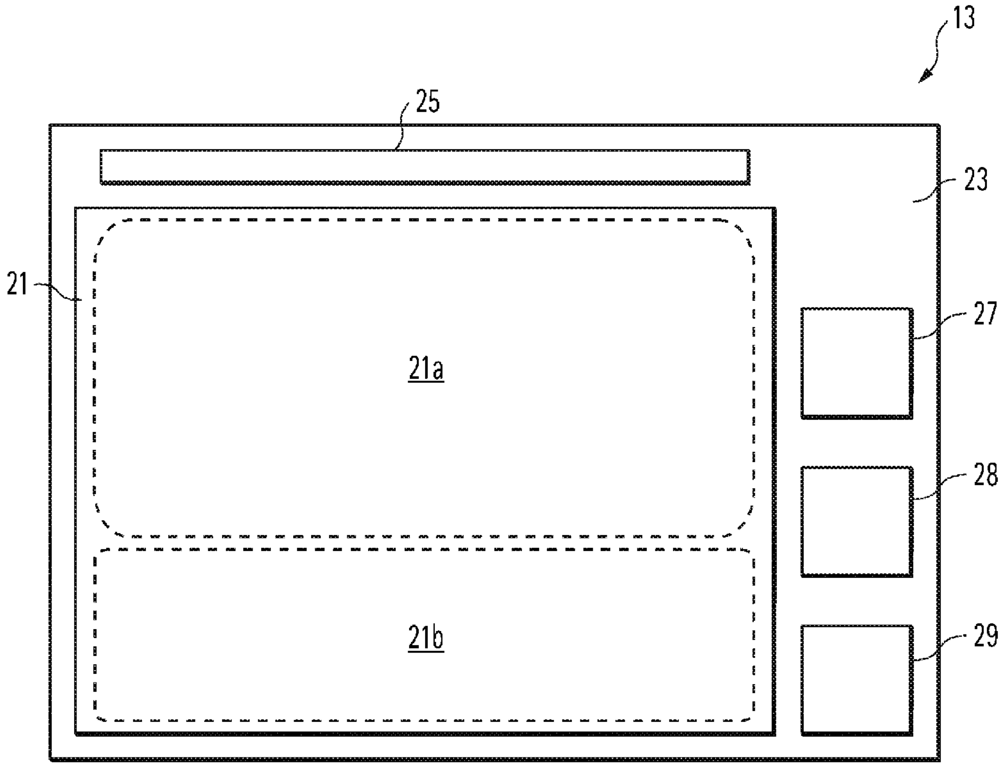
FIG. 2 is a schematic representation of a preferred embodiment of a display device.

FIG. 2 shows a schematic representation of a preferred embodiment of a display device 13.

The display device 13 can form or depict an escape route display, an exit route display, or an exit route sign of the signposting system.

The display device 13 may comprise a dynamic display 21 in a housing 23.

The dynamic display 21 may be a reflective or transflective display. The dynamic display 21 may furthermore be a bistable display that requires a power supply only for changing the display.

According to one embodiment, the dynamic display 21 is an e-paper (electronic paper) display.

The dynamic display 21 may be a multicolored display, in particular a multicolored e-paper display. Pictograms and warnings can thus be displayed with standards-compliant colors.

The multicolored display can be designed to display at least eight colors, in particular green, white, red, yellow, blue, orange, violet, and black. Via a limitation to the most important colors, the dynamic display 21 can be produced cost-effectively. At the same time, the resolution of the dynamic display 21 can be improved by a special color mixing method, what is known as pixel mixing.

Static or dynamic images can be displayed with the dynamic display 21. A static image is, for example, a pictogram or text that does not change over time. A dynamic image is, for example, a blinking display, for example a blinking arrow, or a video.

The dynamic display 21 of the display device 13 shown in FIG. 2 comprises a first display region 21*a* and a second display region 21*b*. The dynamic display 21 may be designed to display, in response to the control signal, different images in the first display region 21*a* and the second display region 21*b*, for example a pictogram in the first display region 21*a* and a text or a blinking arrow in the second display region 21*b*.

The display device 13 may furthermore comprise a lighting system 25. The lighting system 25 is, for example, an LED front lighting system and may be arranged such that the dynamic display 21 is illuminated as completely as possible. In particular given the design of the dynamic display 21 as a reflective e-paper display, readability can be increased by the front lighting system.

Alternatively, the lighting system 25 may also be arranged behind the dynamic display 21. In particular, the dynamic display 21 is a transflective display that is illuminated uniformly in the background by the lighting system 25.

The display device 13 may furthermore comprise a memory 27 in which images for display on the dynamic display 21 are stored completely or partially.

The display device 13 may furthermore comprise a local power supply system, e.g., a local battery 28 or another local power source (e.g., a supercap, a fuel cell, etc.), for supplying power to the dynamic display 21. The display may furthermore also be connected to a central battery system 14 of the signposting system 10.

The display device 13 can interpret the control command of the control unit 15, similarly to a scene retrieval, and present a corresponding image. The control command usually does not comprise the entire image but only an address of the respective display device 13 and an image ID. The communication in particular can thereby be accelerated, and transmission errors can be avoided.

Via the address, the display device 13 can recognize that it is being actuated. For this purpose, dedicated electronics in the display device 13 can read out the address and associate an image via the image ID. The images relating to the image IDs may be stored in the memory 27. The electronics correspondingly actuate the dynamic display 21, which subsequently displays the image.

New images, e.g., new pictograms, may furthermore be loaded via an update function from the battery system 14 or from the cloud 16 into the memory 27 of the display device 13.

The display device 13 may furthermore comprise a communication interface 29. The communication interface 29 is, for example, an NFC interface, a Digital Addressable Lighting Interface (DALI), or a power line communication (PLC) interface.

Images, in particular pictograms, can be transmitted via the communication interface 29 to the memory of the display device 13. Given a transmission via NFC, the images can be loaded directly into the memory of the dynamic display 13 with a smartphone, tablet, or laptop.

Figure 3A:
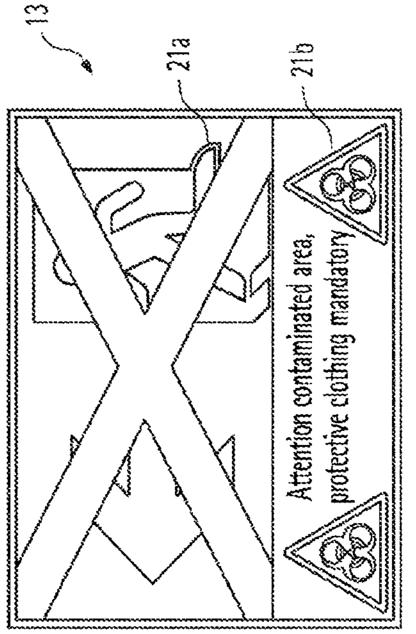
FIGS. 3*a-d* are schematic representations of further embodiments of the display device.
Figure 3B:
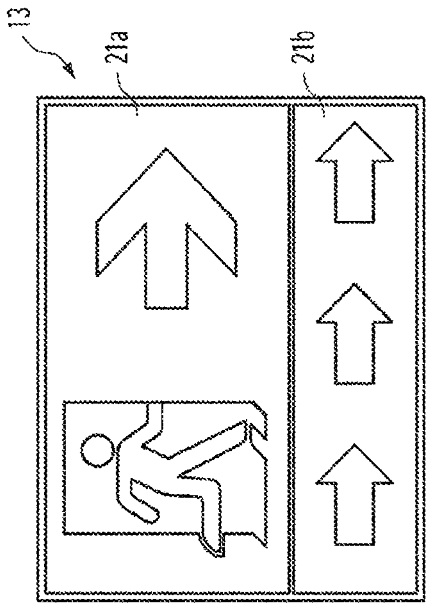

FIGS. 3*a-b* show schematic representations of further embodiments of the display device 13.

The display device 13 can be actuated depending on the situation. In addition to a safety sign, the dynamic display 21 may also display further additional information, e.g., information about dangerous situations, exit route recommendations, alternative routes, persons in distress, etc. The additional information can thereby be directed to the persons in the building or to the rescue workers. Different or supplementary information may thereby be displayed on the first display region 21*a* and the second display region 21*b* of the dynamic display 21.

FIG. 3*a* shows, for example in a first display region 21*a*, a crossed-out safety sign and, in a second, subjacent display region 21*b*, additional information in the form of further pictograms and a warning message relating to a contamination. Persons can thus be informed of a hazard on the exit route and choose an alternative route.

FIG. 3*b* shows a safety sign in the first display region 21*a* and three blinking arrows in the second display region 21*b*. The perception of the exit route display can be increased by the animation in the second display region 21*b*.

Figure 3C:
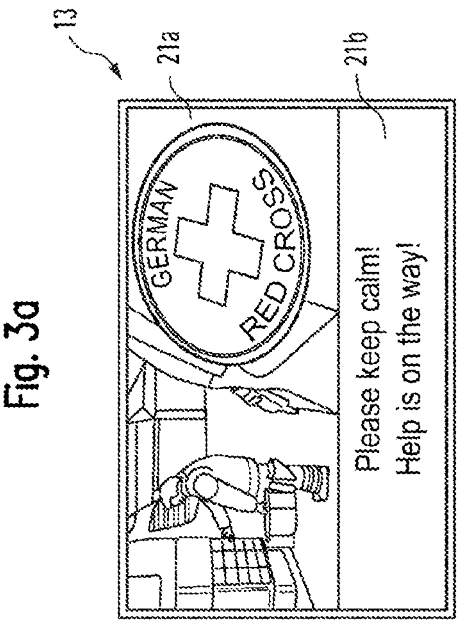

FIG. 3*c* shows a photograph instead of a safety sign in the first display region 21*a*, and safety information in the second display region 21*b*. Persons in the building can thus be informed of a current dangerous situation. Given a terror attack, this safety information is, for example, "Doors have been closed" or "Police are on the way." If a person has actuated an emergency button, e.g., in a hospital or retirement home, this safety information is, for example, "Paramedic is on the way."

Figure 3D:
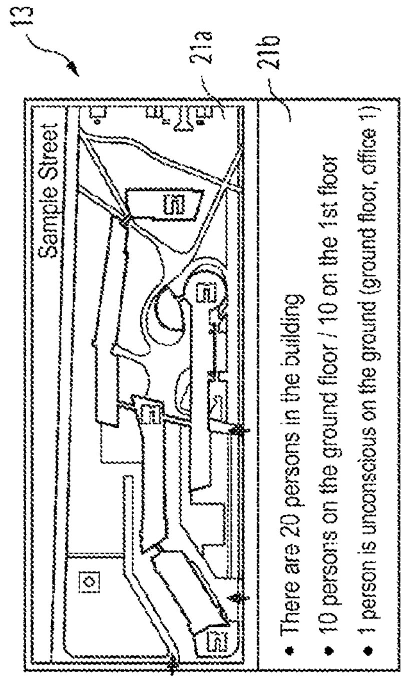

FIG. 3*d* shows a floor plan of the building in the first display region 21*a*, and information about persons in the building in the second display region 21*b*. This information can be ascertained with the sensors 11*a-c*, in particular presence detectors or cameras. Rescue workers, for example, are informed with this display about the current situation in the building. For this purpose, the sensors 11*a-c* sense the number of persons in the building, the location of the persons, and/or the health status of the persons, for example.

The display of this additional safety information, in particular information about persons in the building, may be activatable via a hidden button on the lamp or via special software, e.g., a special app, that is available to the rescue workers. It can thus be ensured that this sensitive information is displayed only in an emergency situation.

Figure 4A:
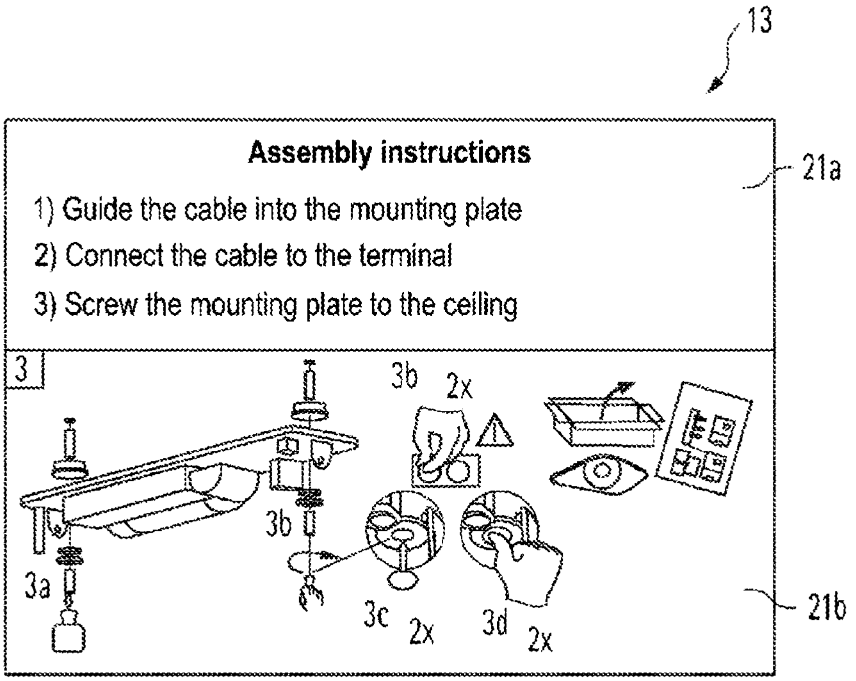
FIGS. 4*a-b* are schematic representations of further embodiments of the display device.
Figure 4B:
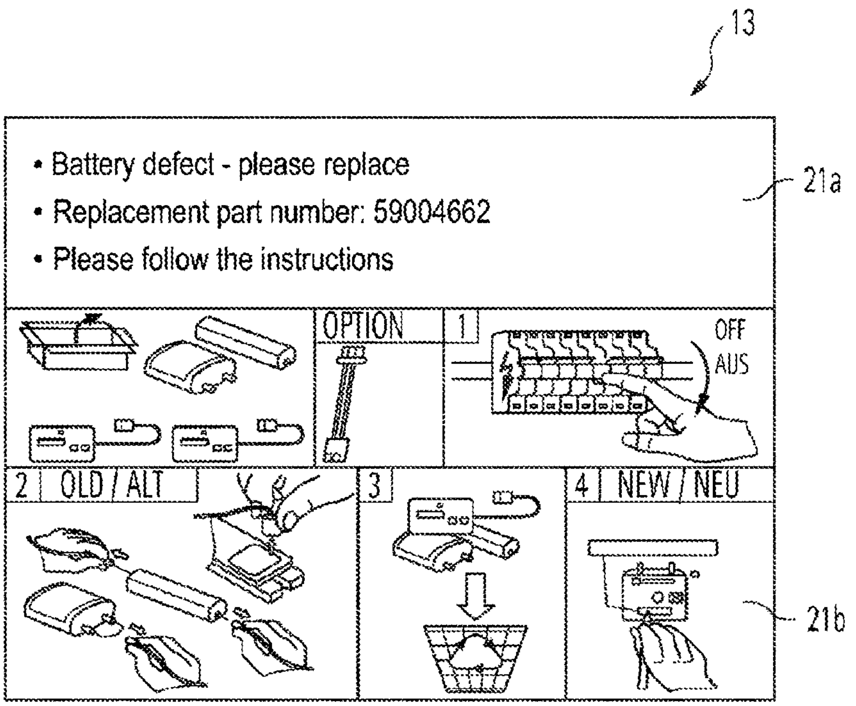

FIGS. 4*a-b* show schematic representations of further embodiments of the display device.

The display device 13 can be placed into a startup mode or a maintenance mode. The startup mode and/or maintenance mode may be activatable using a hidden button on the display device. The hidden button can be arranged such that it cannot be reached or cannot be activated in a normal operation. For example, the startup or maintenance mode can only be activated in an unpowered state of the display device 13.

Alternatively, the startup and/or maintenance mode may be activatable via an NFC interface of the display device 13. The NFC interface can be configured such that it cannot be reached in normal operation.

FIG. 4*a* shows the display device 13 in a startup mode. In this startup mode, the dynamic display 21 shows assembly instructions for the display device 13, for example.

In FIG. 4*a*, the first display region 21*a* of the dynamic display 21 shows step-by-step assembly instructions as text, and the second display region 21*b* shows appropriate images.

In one embodiment, a battery operation of the display device 13 is activated by activating the startup mode. Such a battery operation otherwise takes place only in the event of a power grid failure (emergency operation).

In the startup mode, new images, in particular new pictograms, can be loaded into the memory 27 of the display device 13. The pictograms can be loaded via the communication interface 29 of the display device 13. The pictograms can either be loaded into the memory 27 via a DALI or power line connection of the signposting system 10, or by means of an NFC interface directly on the display device 13.

FIG. 4*b* shows the display device 13 in a maintenance mode. In this maintenance mode, the dynamic display 21 shows, for example, current error messages, replacement parts for troubleshooting, or repair instructions.

In FIG. 4*b*, the first display region 21*a* of the dynamic display 21 shows the maintenance information in text form, and the second display region 21*b* shows appropriate images.

Figure 5:
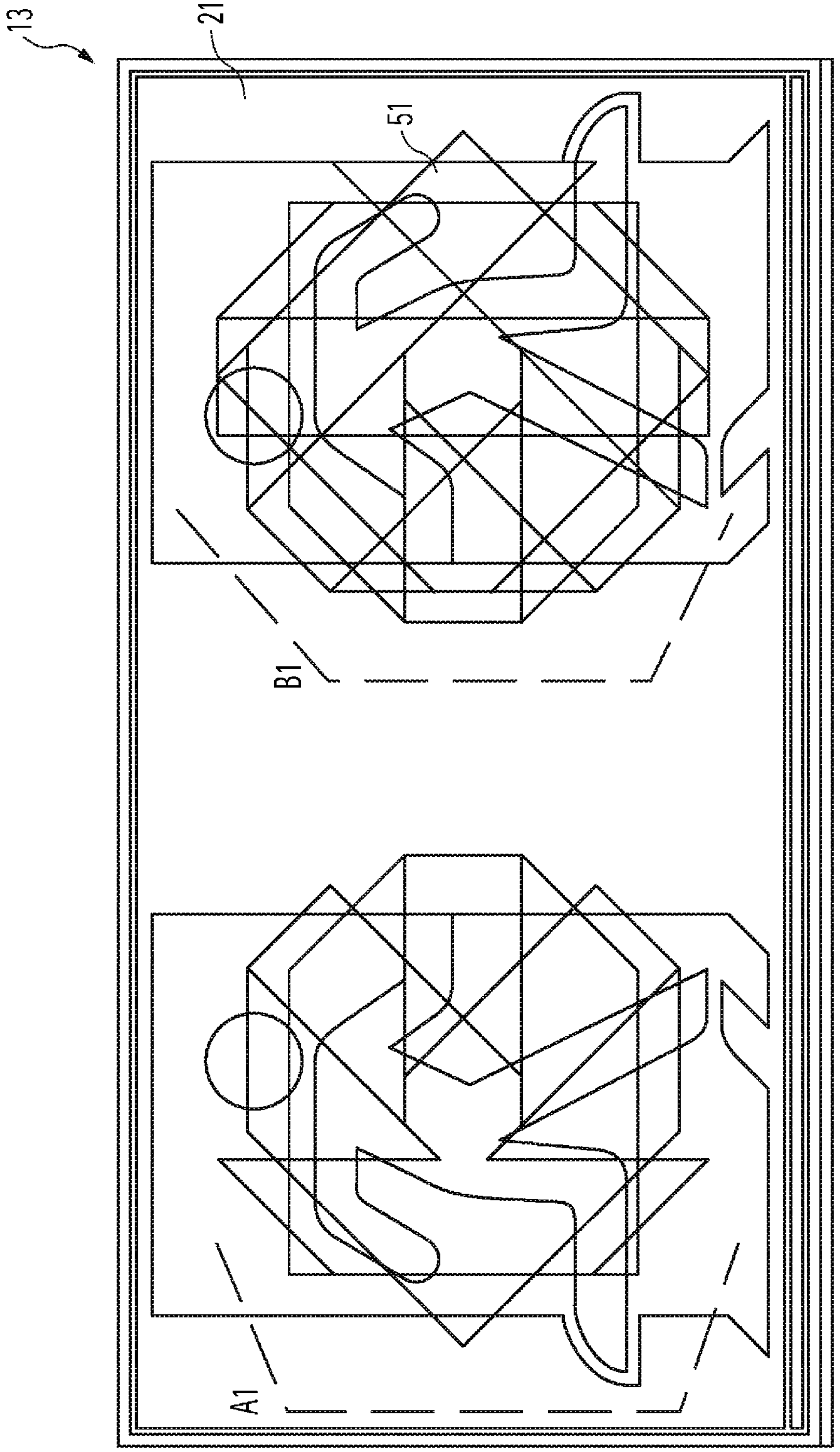
FIG. 5 is a schematic representation of a preferred embodiment of a display device.

FIG. 5 shows a schematic representation of a preferred embodiment of a display device 13.

In FIG. 5, the dynamic display 21 is designed as a segmented display and comprises a plurality of individual segments 51. The segments are defined by superimposing all displayable pictograms.

In one embodiment of the display device 13 as an exit route sign, the displayable pictograms are, for example, arrow directions in 45° steps and a stylized figure, which can respectively be displayed on a left and a right side of the display 21. Superimposing these images results, for example, in approximately 200 segments 51 that are individually actuatable.

The actuation of the individual segments 51 may be realized via an etched backplane. The backplane may comprise dedicated electronics and may be designed to communicate with further electronics of the display device 13. In this way, the backplane can be actuated, for example via an SPI interface, to expose certain segments 51 in order to depict certain pictograms and/or arrows on the display 21.

FIG. 6 shows a preferred embodiment of a lookup table. Which images are displayed by the respective display devices 13*a-c* of a dynamic and/or adaptive signposting system 10 depending on the triggered sensors 11*a-c* can be defined in the lookup table 61.

In the exemplary lookup table 61 in FIG. 6, it is defined which arrow direction the four display devices of a first fire zone and the six display devices of a second fire zone represent depending on six smoke detectors. Depending on which smoke detector detects a fire, a different arrow direction and thus a different exit route can be displayed.

As shown in FIG. 1, the control unit 15 of the signposting system 10 may comprise a logic unit 17 that connects the sensors 11 *a-c* to the display devices 13*a-c*. The logic unit 17 may be designed to ascertain, on the basis of the lookup table, the control commands for actuating the individual display devices 13*a-c*.

The logic unit 17 may be integrated in a computer of the BMZ. Alternatively, the logic unit 17 may be implemented in a separate controller between the BMZ and the central battery system 14, e.g., a LITECOM controller. The logic unit may furthermore also be integrated directly into the central battery system 14, for example in the form of a miniaturized computer. In particular, the logic unit 17 is implemented as software.

Figure 7:
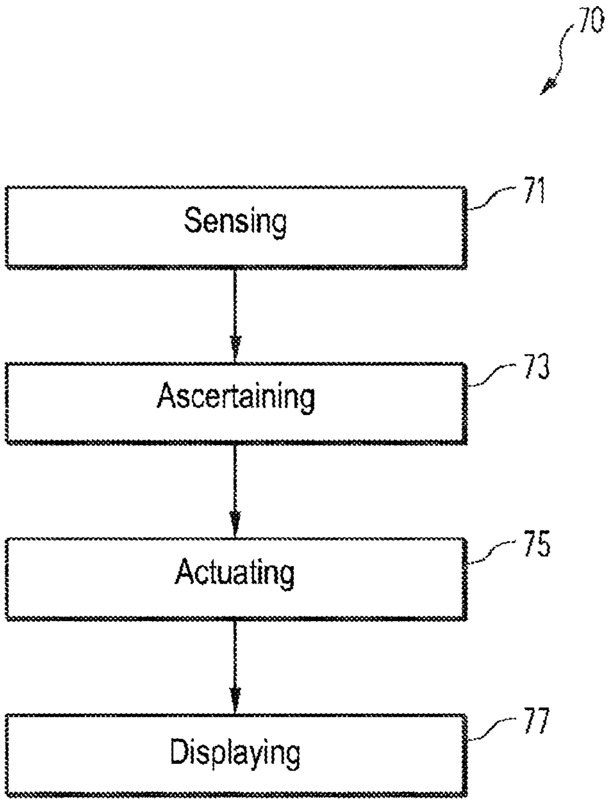
FIG. 7 is a schematic representation of a preferred embodiment of a method for dynamic and/or adaptive signposting.

FIG. 7 shows a schematic representation of a preferred embodiment of a method 70 for dynamic and/or adaptive signposting.

The method 70 comprises sensing 71 a physical variable relevant to a route guidance, ascertaining 73 a control signal on the basis of the sensed physical variable, actuating 75 a display device 13 with the control signal, and displaying 77 a completely or partially prestored image on a dynamic display 21 of the display device 13, wherein the dynamic display 21 is designed to retain the image in an unpowered state.

The method 70 of FIG. 7 can be carried out using the dynamic and/or adaptive signposting system 10 shown by way of example in FIG. 1.

The invention claimed is:

1. A signposting system comprising:

at least one sensor that is designed to sense a physical variable relevant to a route guidance;

at least one display device that comprises a dynamic display, wherein the dynamic display is designed to retain a displayed image in an unpowered state; and control unit that is adapted to ascertain a control signal on the basis of the physical variable relevant to the route guidance; and a cloud with a data memory and an artificial intelligence (AI) algorithm for determining the control signal on the basis of the physical variable relevant for the path guidance and on the basis of variables stored in the data memory of the cloud, wherein the control unit is connected to the cloud, and the control unit is configured to transmit the sensed physical variable to the cloud and to receive from the cloud the control signal or an instruction to ascertain the control signal; and wherein the control unit is further adapted to actuate the at least one display device with the control signal to display a completely or partially prestored image on the dynamic display.

2. The signposting system according to claim 1, wherein the dynamic display comprises an e-paper display.

3. The signposting system according to claim 1, wherein the dynamic display is designed to display pictograms, and/or text as static or dynamic images.

4. The signposting system according to claim 1, wherein the dynamic display is a multicolored display.

5. The signposting system according to claim 1, wherein the dynamic display comprises an LED lighting system that is arranged to illuminate the dynamic display.

6. The signposting system according to claim 1, wherein the dynamic display comprises a first display region and a second display region, wherein the dynamic display is designed to display, in response to the control signal, a static image in the first display region and a dynamic image in the second display region.

7. The signpo sting system according to claim 1, wherein the signposting system comprises a central battery system, for supplying power to the at least one display device, and wherein the at least one display device comprises a local battery, for supplying power.

8. The signpo sting system according to claim 1, wherein the at least one sensor is a smoke detector, a gas sensor, an acoustic sensor, a camera, and/or a presence sensor.

9. The signpo sting system according to claim 1, wherein the signposting system comprises a plurality of sensors comprising a plurality of sensors of different types, for sensing further physical variables relevant to the route guidance, wherein the control unit is designed to additionally ascertain the control signal on the basis of the sensed further physical variables.

10. The signposting system according to claim 1, wherein the at least one display device comprises a memory in which the images for displaying on the dynamic display are completely or partially stored.

11. The signposting system according to claim 1, further comprises at least one acoustic indicator comprising a siren and/or a loudspeaker, for outputting acoustic signals.

12. The signposting system according to claim 1, wherein the control unit is connected to the at least one display device by means of a Digital Addressable Lighting Interface (DALI), a power line communication (PLC) connection, or a wireless connection.

13. The signpo sting system according to claim 1, wherein the at least one display device can be set to a startup mode and/or maintenance mode, wherein the at least one display device is designed to display information relating to maintenance in the maintenance mode, and information relating to the startup of the at least one display device and/or of the signpo sting system in the startup mode.

* * * * *